United States Patent
Hsu

(10) Patent No.: US 8,528,445 B2
(45) Date of Patent: Sep. 10, 2013

(54) REMOTE CONTROL

(76) Inventor: Jung-Yu Hsu, Tainan (TW)

( * ) Notice: Subject to any disclaimer, the term of this patent is extended or adjusted under 35 U.S.C. 154(b) by 826 days.

(21) Appl. No.: 12/659,244

(22) Filed: Mar. 2, 2010

(65) Prior Publication Data
US 2010/0307281 A1 Dec. 9, 2010

(30) Foreign Application Priority Data
Jun. 4, 2009 (TW) ................................ 98209761 U

(51) Int. Cl.
B62K 21/16 (2006.01)
F16C 1/10 (2006.01)
F16C 1/22 (2006.01)

(52) U.S. Cl.
USPC ....... 74/551.7; 74/551.1; 74/551.2; 74/500.5; 74/502.4; 74/502.6; 280/276; 188/299.1

(58) Field of Classification Search
USPC ............... 74/502.6, 489, 550.5, 551.3, 551.7, 74/502.4; 280/276; 188/67, 265, 299.1
IPC ....................................................... B62K 23/02
See application file for complete search history.

(56) References Cited

U.S. PATENT DOCUMENTS

| | | | |
|---|---|---|---|
| 6,767,024 B1 * | 7/2004 | Kuo .............................. | 280/276 |
| 7,353,731 B2 * | 4/2008 | Lin ................................ | 74/551.7 |
| 7,363,873 B2 * | 4/2008 | Iteya et al. .................... | 116/28.1 |
| 2007/0137383 A1 * | 6/2007 | Boehm .......................... | 74/500.5 |
| 2008/0282830 A1 * | 11/2008 | Hara .............................. | 74/489 |

FOREIGN PATENT DOCUMENTS
CN 200920006990 * 3/2009

OTHER PUBLICATIONS
CN 200920006990 human assisted machine translation, Jan. 15, 2013.*

* cited by examiner

Primary Examiner — Richard W Ridley
Assistant Examiner — Yamilka Pinero Medina
(74) Attorney, Agent, or Firm — Bacon&Thomas,PLLC

(57) ABSTRACT

A remote control for a shock absorber has a gripping body with a first positioning element, a pivoting handle and a positioning assembly. The pivoting handle pivotally connects with the gripping body and has a proximal part and a distal part. The proximal part has an abutting surface facing and selectively abutting the gripping body and a core-fastening hole corresponding to the passing hole of the gripping body. The distal part has a communicating recess formed longitudinally through the distal part and also formed in a bottom of the distal part. The positioning assembly is movably mounted in the communicating recess and has a second positioning element exposed from the bottom of the distal part and corresponding to and detachably engaged with the positioning assembly. A rider is able to conveniently control a shock absorber during riding by using the remote control so that facilitates riding.

15 Claims, 4 Drawing Sheets

REMOTE CONTROL

BACKGROUND OF THE INVENTION

1. Field of Invention

The present invention relates to a remote control, and more particularly to a remote control for a shock absorber, which is light and can be assembled easily.

2. Description of the Related Art

In order to make a rider to feel more comfortable during cycling, a shock absorber is mounted with a front fork of a bicycle. The shock absorber is able to absorb and buffer impacts, especially when riding over uneven ground. Therefore, the bicycle with the shock absorber provides a comfortable riding experience.

A lock is mounted in the front fork of a bicycle and is provided as an on-off control for the shock absorber. The lock has a switch located in a top of the front fork, so the rider has to stop riding to adjust the switch, which is inconvenient for the rider. To solve this problem, a conventional remote control was invented and is mounted on a handlebar of the bicycle. Therefore, even though the rider is riding the bicycle, the rider can control the lock by the remote control. However, the conventional remote control has too many elements and is relatively heavy, so suffers from long manufacturing time and large cost to and raises bicycle weight, contrary to popular trends of reducing bicycle weight.

To overcome the shortcomings, the present invention provides a remote control to mitigate or obviate the aforementioned.

SUMMARY OF THE INVENTION

The primary objective of the present invention is to provide a remote control for a shock absorber, which is light and can be assembled easily.

To achieve the objective, the remote control for a shock absorber in accordance with the present invention comprises a gripping body, a pivoting handle and a positioning assembly. The gripping body receives a core of a wire and has a first positioning element. The pivoting handle pivotally connects with the gripping body and has a proximal part and a distal part. The proximal part has an abutting surface and a core-fastening hole. The abutting surface faces and selectively abuts the gripping body. The core-fastening hole is formed in the proximal part to correspond to the passing hole of the gripping body and receives and fastens an end of the core of the wire. The distal part has a communicating recess formed longitudinally through the distal part and also formed in a bottom of the distal part. The positioning assembly is movably mounted in the communicating recess and has a second positioning element exposed from the bottom of the distal part of the pivoting handle, corresponding to and detachably engaged with the positioning assembly.

The present invention provides remote control for the rider to control the shock absorber during riding. Therefore, the rider does not need to stop riding to adjust the shock absorber, so the present invention is convenient for the rider.

Other objectives, advantages and novel features of the invention will become more apparent from the following detailed description when taken in conjunction with the accompanying drawings.

DETAILED DESCRIPTION OF THE INVENTION

Figure 1:
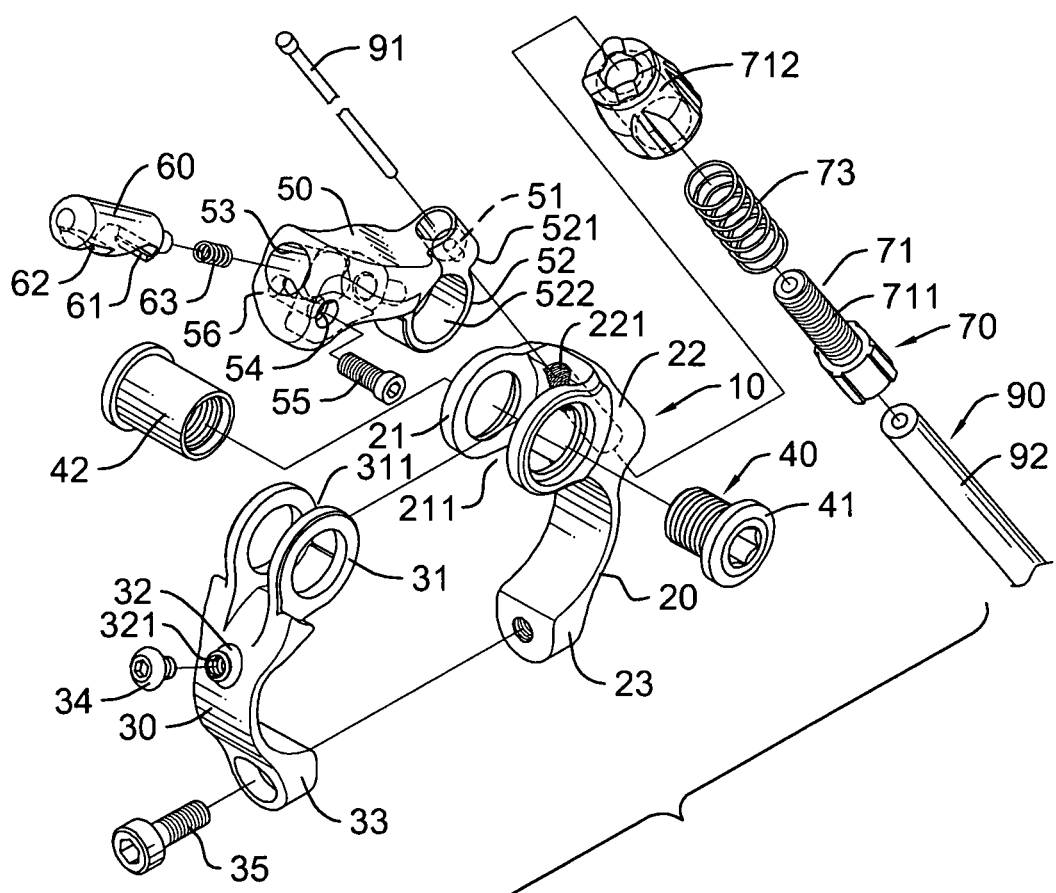
FIG. 1 is an exploded perspective view of a remote control for a shock absorber in accordance with the present invention with a control wire.
Figure 2:
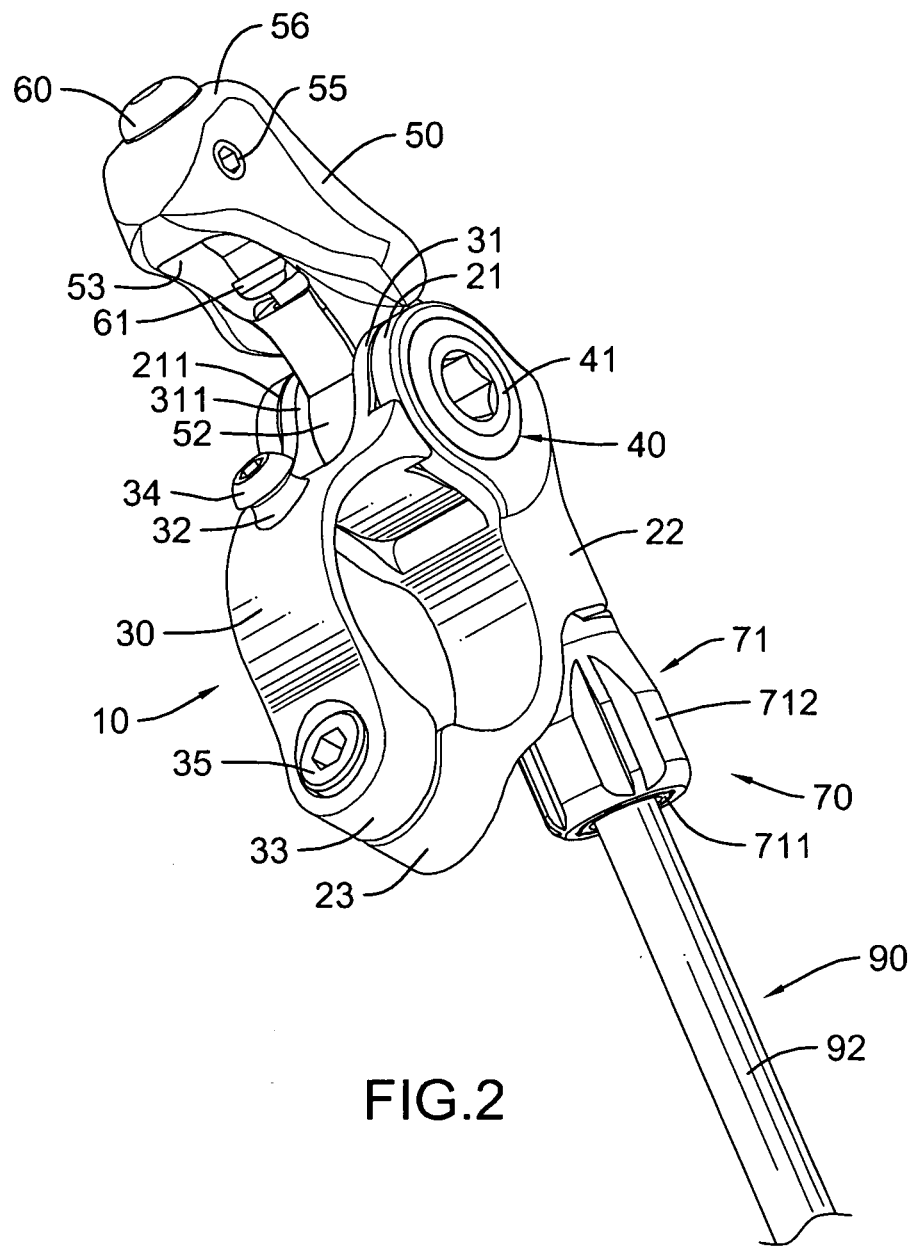
FIG. 2 is a perspective view of the remote control for a shock absorber in FIG. 1 shown with a control wire.
Figure 3:
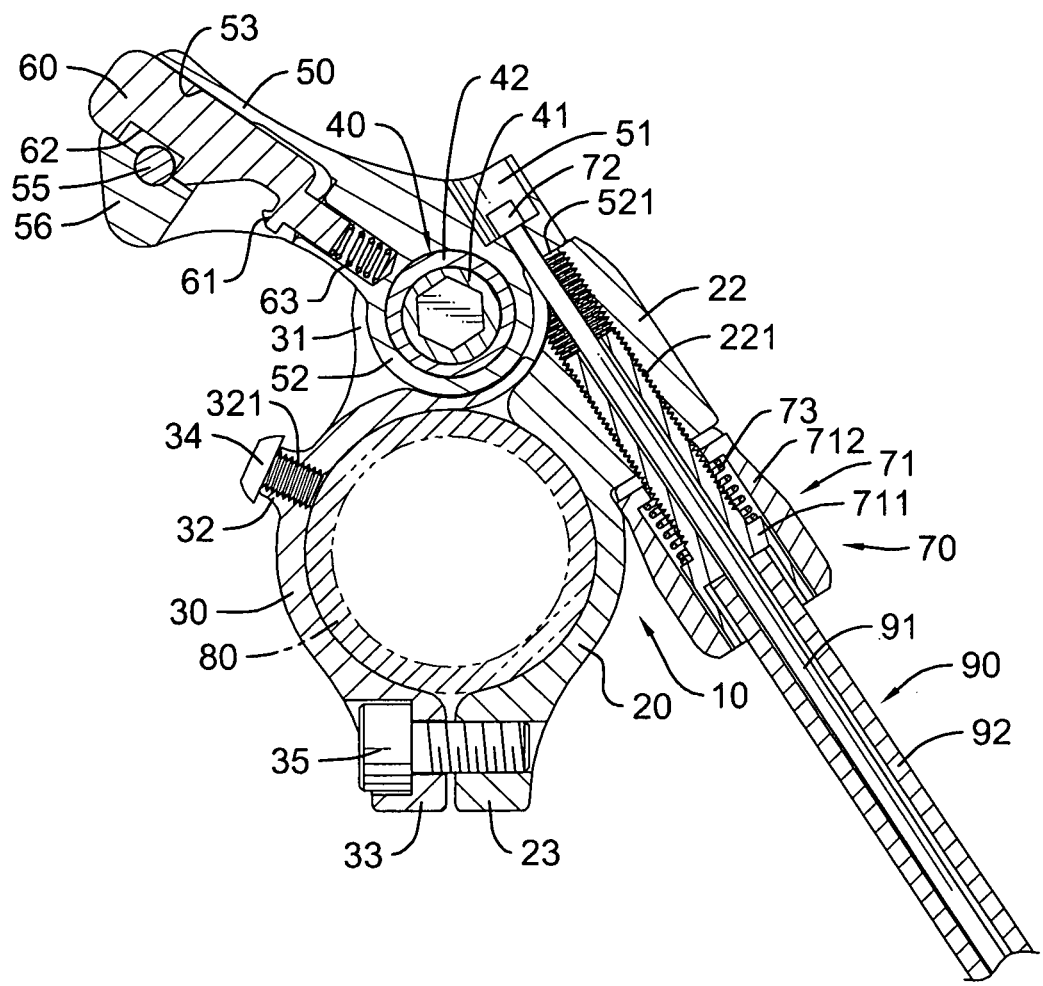
FIG. 3 is an operational side view in partial section of the remote control for a shock absorber in FIG. 1 shown with the control wire.

With reference to FIGS. 1 to 3, a remote control for a shock absorber in accordance with the present invention is fastened to a shaft (80), such as a handlebar of a bicycle, and holds a wire (90). The wire (90) connects with a switch of a lock and has a core (91) and an insulating sheath (92). The remote control has a gripping body (10), a pivoting handle (50), a pivot (40), a positioning assembly (60) and a wire fastener (70).

The gripping body (10) is fastened to the shaft (80) and is assembled by a first half body (20) and a second half body (30).

The first half body (20) has an upper part (22), a middle part, a bottom part (23) and two first pivoting rings (21). The upper part (22) has a passing hole (221). The passing hole (221) is defined through the upper part (22) for receiving the core (91) of the wire (90) and may be threaded. The middle part has an inner curved side with a semicircular shape. The bottom part (23) has a first fastener that may be a threaded hole. The first pivoting rings (21) protrude from the upper part (22) of the first half body (20) in parallel and form a first interval (211) between the first pivoting rings (21).

The second half body (30) is fastened to the first half body (20) and has an upper part (32), a middle part, a bottom part (33) and two second pivoting rings (31). The upper part (32) has an outer surface and a threaded mounting hole (321). The threaded hole (321) is formed in the outer surface. The middle part has an inner curved side, an outer side and a first positioning element (34). The inner curved side has a semicircular shape, forming a circular holding hole between the middle parts of the first and second half bodies (20, 30) when the first and second half bodies (20, 30) are combined, which receives the shaft (80). The first positioning element (34) is mounted on the outer side of the middle part of the second half body (30) and may be a screw to screw in the threaded mounting hole (321). The bottom part (33) has a second fastener. The second fastener corresponds to and is combined with the first fastener of the first half body (20) and may be a through hole allowing a fastening element (35), such as a screw, to combine the first and second fasteners. The second pivoting rings (31) protrude from the upper part (32) of the second half body (30) in parallel, are mounted in the first interval (211) between the first pivoting rings (21), respectively abut the first pivoting rings (21) and form a second interval (311) between the second pivoting rings (31).

The pivoting handle (50) pivotally connects with the gripping body (10) and has proximal part (52) and a distal part (56).

The proximal part (52) has an abutting surface (521), a core-fastening hole (51) and a pivoting hole (522). The abutting surface (521) faces and selectively abuts the upper part (22) of the first half body (20). The core-fastening hole (51) is formed in the proximal part to correspond to the passing hole (221) of the gripping body (10) and receives and fastens an end of the core (91) of the wire (90). The pivoting hole (522) is formed through the proximal part (52) and is pivotally mounted in the second interval (311) between the second pivoting rings (31).

The distal part (56) has a distal end, a bottom, a communicating recess (53), a limiting hole (54) and a limiting element (55). The bottom of the distal part (56) faces the second half body (30). The communicating recess (53) is formed longitudinally through the distal part (56) from the distal end toward the pivoting hole (522) or the core-fastening hole (51) and is also formed in the bottom of the distal part (56). The limiting hole (54) is formed transversely through the distal part (56) below the communicating recess (53) and communicates with the communicating recess (53). The limiting element (55) is mounted in the limiting hole (54) and partially protrudes in the communicating recess (53).

The pivot (40) is mounted in the first pivoting rings (21), the second pivoting rings (31) and the pivoting hole (522) of the pivoting handle (50) to engage the gripping body (10) with the pivoting handle (50) and allows the pivoting handle (50) to rotate pivotally relative to the gripping body (10). The pivot (40) may have a pivoting tube (42) and a bolt (41). The pivoting tube (42) has a tubular body and an enlarged end. The tubular body is mounted in the first and second pivoting rings (21, 31) and the pivoting hole (522) and has an inner threaded hole. The enlarged end abuts one of the first pivoting rings (21). The bolt (41) engages with the pivoting tube (42) and has a threaded shaft and an enlarged end. The threaded shaft is fastened in the tubular body. The enlarged end of the bolt (41) abuts the other first pivoting rings (21), so the enlarged ends of the pivoting tube (42) and the bolt (41) prevent the pivot (40) from being detached from the gripping body (10) and the pivoting handle (50).

The positioning assembly (60) is inserted in the communicating recess (53) from the distal end of the distal part (56) of the pivoting handle (50) and has a resilient element (63) and a pressing shaft. The resilient element (63) is mounted in the communicating recess (53) near the pivoting hole (522) or the core-fastening hole (51). The pressing shaft is movably mounted in the communicating recess (53) near the distal end of the distal part (56) of the pivoting handle (50), presses against the resilient element (63), is exposed from the bottom of the distal part (56) of the pivoting handle (50) and has a proximal surface, a distal surface, an outer surface, a second positioning element (61) and a limiting recess (62). The proximal surface of the pressing shaft abuts the resilient element (63). The distal surface of the pressing shaft is located out of the communicating recess (53) and can be pushed by a rider. The second positioning element (61) is formed on the outer surface of the pressing shaft, is exposed from the bottom of the distal part (56) of the pivoting handle (50), corresponds to and is detachably engaged with the first positioning element (34) and may be a hook. The limiting recess (62) is formed in the outer surface of the pressing shaft, receives part of the limiting element (55) protruding in the communicating recess (53), allows the limiting element (55) to be positioned movably in the limiting recess (62) and has a proximal positioning side and a distal limiting side. The proximal positioning side is formed near the second positioning element (61) and detachably abuts the limiting element (55) to prevent the positioning assembly (60) from being detached from the communicating recess (53). The distal limiting side is formed near the proximal surface of the pressing shaft, is opposite to the proximal positioning side and limits the limiting element (55) to move in the limiting recess (62) between the proximal positioning side and the distal limiting side.

The wire fastener (70) connects with the gripping body (10) and has a fastening bolt (71), a hollow protecting cylinder (712) and a resilient element (73). The fastening bolt (71) has a mounting hole, an enlarged portion and a threaded bar (711). The mounting hole is defined longitudinally through the fastening bolt and receives the core (91) of the wire (90). The enlarged portion receives an end of the insulating sheath (92). The threaded bar (711) screws in the passing hole (221) to fasten the wire fastener (70) to the gripping body (10). The protecting cylinder (712) abuts the upper part (22) of the first half body (20), receives the enlarged portion of the fastening bolt (71) and has an inner chamber, a proximal end, a distal end, a proximal hole and a distal hole. The proximal end faces the passing hole (221) of the first half body (20). The proximal hole is defined through the proximal end, communicates with the inner chamber and allows part of the threaded bar (711) of the fastening bolt (71) to protrude out of the protecting cylinder (712). The distal hole is defined through the distal end, communicates with the inner chamber and allows the fastening bolt (71) to be inserted into the inner chamber from the distal hole. The resilient element (73) is mounted in the protecting cylinder (712) between the enlarged portion of the fastening bolt (71) and the proximal end of the protecting cylinder (712).

With reference to FIG. 3, the circular holding hole formed by the middle parts of the first and second half bodies (20, 30) receives a handlebar of a bicycle. When the shock absorber is not in use, the abutting surface (521) abuts the upper part (22) of the first half body (20) while the distal part (56) of the pivoting handle (50) is far away from the second half body (30), so the core (91) of the wire (90) has not yet been pulled. The limiting element (55) abuts the proximal positioning side of the limiting recess (62).

Figure 4:
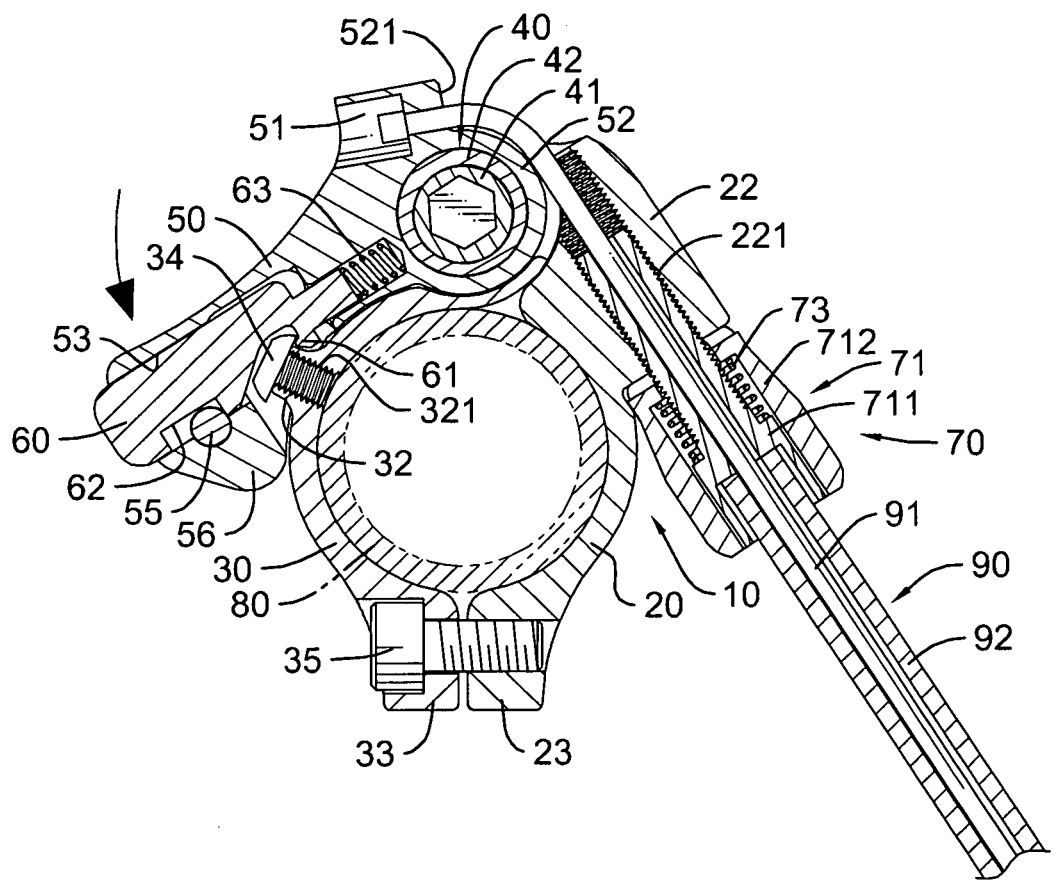
FIG. 4 is an operational side view in partial section of the remote control for a shock absorber in FIG. 3 shown with the control wire in FIG. 3 when a pivoting handle is pressed against the gripping body for pulling a core of a wire.

With reference to FIG. 4, when the rider intends to use the shock absorber, the rider only needs to press the distal part (56) of the pivoting handle (50) toward the second half body (30), so the pivoting handle (50) rotates pivotally allowing the second positioning element (61) to be engaged with the positioning assembly (34). Meanwhile, the abutting surface (521) is separated from the upper part (22) of the first half body (20). Because the core-fastening hole (51) fastens the core (91), the core (91) is pulled to drive the switch of the lock.

When the rider intends to stop the shock absorber, the rider just presses the distal surface of the pressing shaft of the positioning assembly (60) allowing the proximal surface of the pressing shaft of the positioning assembly (60) to abut the resilient element (63), so the distal limiting side abuts the limiting element (55) and the second positioning element (61) can be detached from the positioning assembly (34). The rider is able to adjust the pivoting handle (50) to an original position, where the abutting surface (521) abuts the upper part (22) of the first half body (20).

The present invention provides remote control for the rider to control the shock absorber during riding. Therefore, the rider does not need to stop riding for adjusting the shock absorber, so the present invention is convenient for the rider. Furthermore, the present invention is easily assembled and is lighter than a conventional remote control, so conforms with trends to reduce bicycle weight.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A remote control for a shock absorber comprising:
   a gripping body having
      a first half body having
         an upper part having a passing hole adapted for receiving a core of a wire; and
         two first pivoting rings protruding from the upper part of the first half body in parallel and forming a first interval between the first pivoting rings; and a second half body fastened to the first half body to form a circular holding hole adapted to receive a cylindrical shaft, and the second half body having
an upper part;
a first positioning element mounted on the second half body; and
two second pivoting rings protruding from the upper part of the second half body in parallel, mounted in the first interval between the first pivoting rings, respectively abutting the first pivoting rings and forming a second interval between the second pivoting rings;
a pivoting handle pivotally connecting with the gripping body and having
a proximal part having
an abutting surface facing and selectively abutting the first half body;
a core-fastening hole formed in the proximal part to correspond to the passing hole of the gripping body and adapted to receive and fasten an end of the core of the wire; and
a pivoting hole formed through the proximal part and pivotally mounted in the second interval between the second pivoting rings; and
a distal part having
a distal end;
a bottom facing the second half body; and
a communicating recess formed longitudinally through the distal part from the distal end toward the core-fastening hole and also formed in the bottom of the distal part; and
a positioning assembly movably mounted in the communicating recess and having a pressing shaft movably mounted in the communicating recess and having a second positioning element formed on the pressing shaft, exposed from the bottom of the distal part of the pivoting handle, corresponding to and detachably engaged with the first positioning element of the gripping body.

2. The remote control for a shock absorber as claimed in claim 1, further comprising a pivot mounted in the first pivoting rings, the second pivoting rings and the pivoting hole of the pivoting handle to engage the gripping body with the pivoting handle, allowing the pivoting handle to rotate pivotally relative to the gripping body and having
a pivoting tube having
a tubular body mounted in the first and second pivoting rings and the pivoting hole and having an inner threaded hole; and
an enlarged end abutting one of the first pivoting rings; and
a bolt engaging with the pivoting tube and having
a threaded shaft fastened in the tubular body; and
an enlarged end abutting the other first pivoting ring; wherein the enlarged ends of the pivoting tube and the bolt prevent the pivot from being detached from the gripping body and the pivoting handle.

3. The remote control for a shock absorber as claimed in claim 2, wherein the passing hole is threaded; and
the remote control for a shock absorber further comprises a wire fastener connecting with the gripping body and having
a fastening bolt having
a mounting hole defined longitudinally through the fastening bolt and adapted to receive the core of the wire;
an enlarged portion adapted to receive an end of an insulating sheath of the wire; and
a threaded bar screwing in the passing hole to fasten the wire fastener to the gripping body;
a hollow protecting cylinder abutting the upper part of the first half body, receiving the enlarged portion of the fastening bolt and having
an inner chamber;
a proximal end facing the passing hole of the first half body;
a distal end;
a proximal hole defined through the proximal end, communicating with the inner chamber and allowing part of the threaded bar of the fastening bolt to protrude out of the protecting cylinder and screw with the first half body; and
a distal hole defined through the distal end, communicating with the inner chamber and allowing the fastening bolt to be inserted into the inner chamber from the distal hole; and
a resilient element mounted in the protecting cylinder between the enlarged portion of the fastening bolt and the proximal end of the protecting cylinder.

4. The remote control for a shock absorber as claimed in claim 1, wherein
the second half body has a threaded mounting hole; and
the first positioning element is a screw screwing in the threaded mounting hole.

5. The remote control for a shock absorber as claimed in claim 2, wherein
the second half body has a threaded mounting hole; and
the first positioning element is a screw screwing in the threaded mounting hole.

6. The remote control for a shock absorber as claimed in claim 3, wherein
the second half body has a threaded mounting hole; and
the first positioning element is a screw screwing in the threaded mounting hole.

7. The remote control for a shock absorber as claimed in claim 1, wherein
the distal part of the pivoting handle further has
a limiting hole formed transversely through the distal part and communicating with the communicating recess; and
a limiting element mounted in the limiting hole and partially protruding in the communicating recess;
the positioning assembly further has
a resilient element mounted in the communicating recess near the core-fastening hole; and
the pressing shaft of the positioning assembly is mounted in the communicating recess near the distal end of the distal part of the pivoting handle, presses against the resilient element of the positioning assembly, is exposed from the bottom of the distal part of the pivoting handle and further has a limiting recess formed in an outer surface of the pressing shaft, receiving at least part of the limiting element and allowing the limiting element to be positioned movably in the limiting recess.

8. The remote control for a shock absorber as claimed in claim 2, wherein
the distal part of the pivoting handle further has
a limiting hole formed transversely through the distal part and communicating with the communicating recess; and
a limiting element mounted in the limiting hole and partially protruding in the communicating recess;
the positioning assembly further has
a resilient element mounted in the communicating recess near the core-fastening hole; and
the pressing shaft of the positioning assembly is mounted in the communicating recess near the distal end of the distal part of the pivoting handle, presses against the resilient element of the positioning assembly, is exposed from the bottom of the distal part of the pivoting handle and further has a limiting recess formed in an outer surface of the pressing shaft, receiving at least part of the limiting element and allowing the limiting element to be positioned movably in the limiting recess.

9. The remote control for a shock absorber as claimed in claim 3, wherein
the distal part of the pivoting handle further has
a limiting hole formed transversely through the distal part and communicating with the communicating recess; and
a limiting element mounted in the limiting hole and partially protruding in the communicating recess;
the positioning assembly further has
a resilient element mounted in the communicating recess near the core-fastening hole; and
the pressing shaft of the positioning assembly is mounted in the communicating recess near the distal end of the distal part of the pivoting handle, presses against the resilient element of the positioning assembly, is exposed from the bottom of the distal part of the pivoting handle and further has a limiting recess formed in an outer surface of the pressing shaft, receiving at least part of the limiting element and allowing the limiting element to be positioned movably in the limiting recess.

10. The remote control for a shock absorber as claimed in claim 4, wherein
the distal part of the pivoting handle further has
a limiting hole formed transversely through the distal part and communicating with the communicating recess; and
a limiting element mounted in the limiting hole and partially protruding in the communicating recess;
the positioning assembly further has
a resilient element mounted in the communicating recess near the core-fastening hole; and
the pressing shaft of the positioning assembly is mounted in the communicating recess near the distal end of the distal part of the pivoting handle, presses against the resilient element of the positioning assembly, is exposed from the bottom of the distal part of the pivoting handle and further has a limiting recess formed in an outer surface of the pressing shaft, receiving at least part of the limiting element and allowing the limiting element to be positioned movably in the limiting recess.

11. The remote control for a shock absorber as claimed in claim 5, wherein
the distal part of the pivoting handle further has
a limiting hole formed transversely through the distal part and communicating with the communicating recess; and
a limiting element mounted in the limiting hole and partially protruding in the communicating recess;
the positioning assembly further has
a resilient element mounted in the communicating recess near the core-fastening hole; and
the pressing shaft of the positioning assembly is mounted in the communicating recess near the distal end of the distal part of the pivoting handle, presses against the resilient element of the positioning assembly, is exposed from the bottom of the distal part of the pivoting handle and further has a limiting recess formed in an outer surface of the pressing shaft, receiving at least part of the limiting element and allowing the limiting element to be positioned movably in the limiting recess.

12. The remote control for a shock absorber as claimed in claim 6, wherein
the distal part of the pivoting handle further has
a limiting hole formed transversely through the distal part and communicating with the communicating recess; and
a limiting element mounted in the limiting hole and partially protruding in the communicating recess;
the positioning assembly further has
a resilient element mounted in the communicating recess near the core-fastening hole; and
the pressing shaft of the positioning assembly is mounted in the communicating recess near the distal end of the distal part of the pivoting handle, presses against the resilient element of the positioning assembly, is exposed from the bottom of the distal part of the pivoting handle and further has a limiting recess formed in an outer surface of the pressing shaft, receiving at least part of the limiting element and allowing the limiting element to be positioned movably in the limiting recess.

13. The remote control for a shock absorber as claimed in claim 1, wherein
the first half body further has
a middle part having an inner curved side with a semi-circular shape; and
a bottom part having a first fastener; and
the second half body further has
a middle part having an inner curved side with a semi-circular shape and combined with the middle part of the first half body to form the circular holding hole; and
a bottom part having a second fastener corresponding to and combined with the first fastener of the first half body with a fastening element.

14. The remote control for a shock absorber as claimed in claim 2, wherein
the first half body further has
a middle part having an inner curved side with a semi-circular shape; and
a bottom part having a first fastener; and
the second half body further has
a middle part having an inner curved side with a semi-circular shape and combined with the middle part of the first half body to form the circular holding hole; and
a bottom part having a second fastener corresponding to and combined with the first fastener of the first half body with a fastening element.

15. The remote control for a shock absorber as claimed in claim 3, wherein
the first half body further has
a middle part having an inner curved side with a semi-circular shape; and
a bottom part having a first fastener; and
the second half body further has
a middle part having an inner curved side with a semi-circular shape and combined with the middle part of the first half body to form the circular holding hole; and
a bottom part having a second fastener corresponding to and combined with the first fastener of the first half body with a fastening element.

* * * * *